F. G. LORENZEN.
PEARL SAGO SUBSTITUTE AND METHOD OF MAKING THE SAME FROM CORN STARCH.
APPLICATION FILED JULY 31, 1911.
1,024,214.
Patented Apr. 23, 1912.
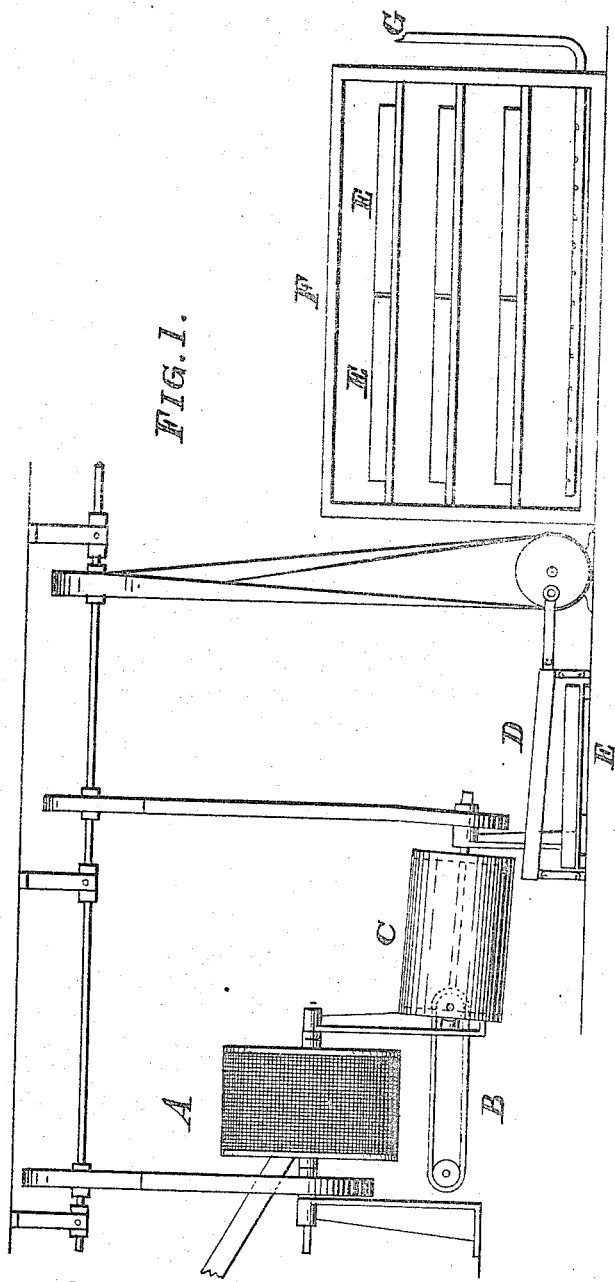
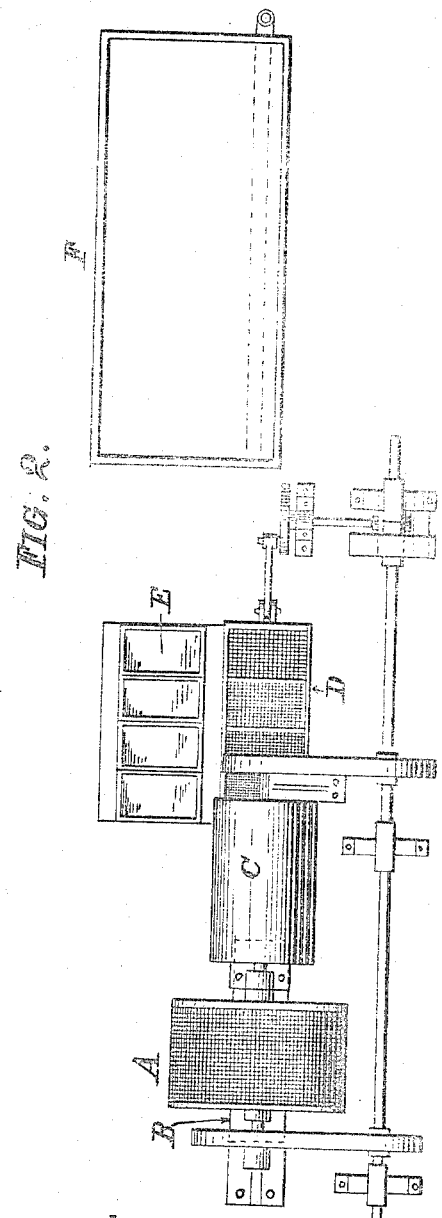
Witnesses:
C. B. Knudsen,
A. G. Peterson.
Inventor:
Frederick G. Lorenzen,
By Michael J. Stark & Sons,
Attorneys

UNITED STATES PATENT OFFICE.

FREDERICK G. LORENZEN, OF CHICAGO, ILLINOIS.

PEARL-SAGO SUBSTITUTE AND METHOD OF MAKING THE SAME FROM CORN-STARCH.

1,024,214.
Specification of Letters Patent. Patented Apr. 23, 1912.
Application filed July 31, 1911. Serial No. 641,423.

*To all whom it may concern:*

Be it known that I, FREDERICK G. LORENZEN, a subject of the Emperor of Germany, and resident of Chicago, in the county of Cook and State of Illinois, have invented certain new and useful Improvements in Pearl-Sago Substitutes and Methods of Making the Same from Corn-Starch; and I do hereby declare that the following description of my said invention is a full, clear, and exact specification, which will enable others skilled in the art to which my said invention appertains to make and use the same.

This invention has general reference to the manufacture of a substitute pearl sago from corn starch; and it consists, essentially, in the various steps and manipulations of corn starch, whereby a substitute for pearl sago and pearl tapioca is produced from corn starch in an efficient and wholesome manner. Pearl sago and pearl tapioca, as heretofore imported from the West Indies, Brazil, Australia, etc., are made from starch removed or extracted from the pith of various palms, and from the fecula of a certain root. These articles are more or less irregular in shape and seldom, if ever globular, and they are translucent or approximately transparent when viewed by transmitted light. The method of manufacture of these articles of food is substantially, as follows: The dry starch obtained from the sources mentioned, is moistened and then passes through a sieve and dropped into a heated pan in floccular form. The dry heat causes the particles to swell and thereby to assume a gelatinous form. These particles consist of partly gelatinized and partly unaltered starch. Tapioca and sago are also made from potato starch, in essentially the same manner as heretofore described, and are so nearly the appearance of the genuine article that it is difficult, if not impossible to distinguish one from the other. In order to produce a substitute for these articles of food which possesses all the qualities of the genuine article and which can be sold at a very much lower price, I employ corn starch which, as compared with starch obtained from potatoes or other sources, is ever so much cheaper, whereby an article of food is secured which for its nourishing qualities is fully equal to the genuine article. To fully understand the method of manufacture of this article of food, I refer to the accompanying sheet of drawings in which—

Figure 1 is an elevation of a set of machines employed in the production of this article. Fig. 2 is a plan of the same.

Like parts are designated by the same letters of reference in both figures.

In the manufacture of this article, I collect the corn starch from the starch tables when the starch contains still about 45 or 50 per cent. of water; or, when dry corn starch is to be used, I mix the same with water in substantially the same proportion stated: This pulpy mass is then placed into a sifter, A, preferably a rotary machine having a jacket of wire cloth of proper mesh, whereby the mass in passing through the meshes of the sifter is reduced to a flaky consistence. From this machine I pass the flaky particles, by means of any suitable conveyer B, to a rotary drum or tumbling barrel C, wherein the flaky particles are formed into a globular form by being slowly rolled or tubbed in said drum C. From the lower end of this drum the globular particles are dropped upon a shaker D, having a wire screen bottom of varying mesh whereby the globular bodies are graded as to size and passing through the meshes of this shaker drop into grates or trays E, which trays have, preferably a bottom formed from open woven fabric. These trays are then placed into a closed chamber or steam chest F, wherein the globular bodies are subjected to moist heat preferably steam admitted to said chamber F through a pipe G, having perforations for the escape of steam, as shown, which steam will gelatinize and cook the starch. After a sufficient exposure to the heated and moist atmosphere in the closed chamber, the trays are removed therefrom and the substance subjected to friction in any suitable manner to separate the granulated particles which in the gelatinizing process became adhesive, after which the article is dried by moderate heat, when the same is ready for packing for the market.

When it is desired to produce a substitute for pearl sago or pearl tapioca having a pronounced color, I mix with the pulp a sufficient quantity of a suitable coloring matter, preferably vegetable substances together with the required quantity of water, and then proceed in the manufacture of this article of food, in the manner heretofore described. These coloring matters are not injurious to health, and the article of food thus obtained is fully as valuable as an article of food, and equal to the genuine imported article.

The employment of corn starch in the production of this article of food enables me to manufacture this substitute for pearl sago and pearl tapioca at a comparatively low cost.

I have heretofore mentioned pearl sago and pearl tapioca, but in the claims I shall specify but one of these articles of food for the reason that they are practically the same, both in appearance and in food value.

The article of food produced from corn starch in the manner heretofore described is readily distinguished from the genuine article or that produced from potato starch by its appearance. Thus, while the genuine article and that produced from potato starch are clear and translucent, the article produced by my method of manufacture from corn starch has a whitish or milky appearance and is neither transparent nor translucent when examined by transmitted light.

Having thus fully described this invention, I claim as new and desire to secure to me by Letters Patent of the United States—

1. As an improved article of manufacture, a substitute for pearl sago made from corn starch, said article being readily distinguished from genuine sago by its milky appearance and globular form.

2. As an improved article of manufacture, a substitute for pearl sago made from corn starch and artificially colored, said article being readily distinguished from genuine sago by its non-transparent appearance when examined by transmitted light, and its globular contour.

3. The method of manufacturing a substitute for pearl sago and pearl tapioca, which consists in mixing corn starch with approximately 45 per cent. of water to a pasty consistence, then dividing the mass into flaky particles, then rolling these flaky particles into globular, shot-like, contour, then subjecting these particles to the action of moist heat to gelatinize and cook the same, then subjecting the particles to friction to separate the bodies, and finally heating the product by moderate heat to dry the same.

4. The method of manufacturing a substitute for pearl sago and pearl tapioca, which consists in mixing with corn starch coloring matter and sufficient water to form a pulp, then dividing the mass into flaky particles, then forming these flaky particles into globular, shot-like, contour, then subjecting these particles to the action of moist heat to gelatinize and cook the same, then subjecting these particles to friction to separate the same, and finally drying the product.

In testimony that I claim the foregoing as my invention, I have hereunto set my hand in the presence of two subscribing witnesses.

FREDERICK G. LORENZEN.

Witnesses:
MICHAEL J. STARK,
G. TODSEN.